US008543122B2

(12) United States Patent
Kountouris (10) Patent No.: US 8,543,122 B2
(45) Date of Patent: Sep. 24, 2013

(54) CREATION OF A PILOT CHANNEL IN AN OPPORTUNISTIC RADIO COMMUNICATIONS SYSTEM

(75) Inventor: Apostolos Kountouris, Grenoble (FR)

(73) Assignee: France Telecom, Paris (FR)

( * ) Notice: Subject to any disclaimer, the term of this patent is extended or adjusted under 35 U.S.C. 154(b) by 537 days.

(21) Appl. No.: 12/744,446

(22) PCT Filed: Nov. 7, 2008

(86) PCT No.: PCT/FR2008/052016
§ 371 (c)(1),
(2), (4) Date: May 24, 2010

(87) PCT Pub. No.: WO2009/068799
PCT Pub. Date: Jun. 4, 2009

(65) Prior Publication Data
US 2010/0255853 A1   Oct. 7, 2010

(30) Foreign Application Priority Data
Nov. 23, 2007 (FR) ...................................... 07 59282

(51) Int. Cl.
*H04W 72/00* (2009.01)
(52) U.S. Cl.
USPC ........................................................ 455/450
(58) Field of Classification Search
USPC ........................................................ 455/450
See application file for complete search history.

(56) References Cited

U.S. PATENT DOCUMENTS

| 6,597,677 | B1 * | 7/2003 | Segawa | 370/342 |
| 2006/0211395 | A1 * | 9/2006 | Waltho | 455/277.1 |
| 2007/0041311 | A1 * | 2/2007 | Baum et al. | 370/208 |
| 2007/0155323 | A1 * | 7/2007 | Matsumoto et al. | 455/39 |
| 2007/0230324 | A1 * | 10/2007 | Li et al. | 370/204 |
| 2008/0299984 | A1 * | 12/2008 | Shimomura et al. | 455/446 |

OTHER PUBLICATIONS

International Search Report and Written Opinion, dated May 14, 2009 for corresponding International Application No. PCT/FR2008/052016, filed Nov. 7, 2008.
Rashad I. et al., "Efficient Pilot Pattern for OFDM-based cognitive channel estimation. Part 1" 14th IEEE Annual Symposium on Communications & Vehicular Technology (SCVT) Nov. 15, 2007 DELF, Netherlands, pp. 164-168, XP002483974.
Perez-Romero J. et al., "A Novel on-demand cognitive pilot channel enabling dynamic spectrum allocation" 2007 2nd IEEE International Symposium on New Frontiers in Dynamic Spectrum Access Networks Apr. 17-20, 2007 Dublin, Ireland, pp. 46-54, XP002483697.
Martigne P. et al., "An alternative concept to scanning process for cognitive radio systems: technical and regulatory issues" 16th IST Mobile and Wireless Communications Summit, Jul. 1-5, 2007, pp. 1018-1022, XP002483696.

* cited by examiner

*Primary Examiner* — Nathan Mitchell
(74) *Attorney, Agent, or Firm* — David D. Brush; Westman, Champlin & Kelly, P.A.

(57) ABSTRACT

A method and apparatus are provided for creating a pilot channel in an opportunistic radio communication system whose frequency spectrum comprises a set of frequency bands and for which system the successive frames of a radio communication channel are divided into time intervals. The method includes the steps of: opportunistically selecting a free frequency band from the frequency spectrum, so as to support the pilot channel; sending a beacon signal over at least one time interval of the successive frames of the pilot channel and probing the free frequency band over at least one time interval distinct from the previous one.

13 Claims, 6 Drawing Sheets

CREATION OF A PILOT CHANNEL IN AN OPPORTUNISTIC RADIO COMMUNICATIONS SYSTEM

CROSS-REFERENCE TO RELATED APPLICATIONS

This application is a Section 371 National Stage Application of International Application No. PCT/FR2008/052016, filed Nov. 7, 2008 and published as WO 2009/068799 on Jun. 4, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the present disclosure is that of radio, and more particularly opportunistic radio. To be more precise, the disclosure relates to a method of creating a pilot channel in an opportunistic radio communications system (ORCS).

BACKGROUND OF THE DISCLOSURE

An opportunistic radio communications system, for example a cellular opportunistic radio communications system, includes two types of equipment: terminals and radio communications network access units. A network access unit can serve a plurality of terminals in its coverage area.

These two types of equipment (terminals and network access units) use an opportunistic radio communications protocol.

In a cellular opportunistic radio communications system the opportunistic radio communications protocol defines various types of communications channel between a network access unit and the terminals that it serves. The opportunistic radio communications protocol also defines procedures for setting up and maintaining these communications channels.

Two types of communications channel are defined: pilot channels and traffic channels.

A pilot channel is a communications channel that supports signaling and exchanges relating to call control in opportunistic radio communications systems. A pilot channel is created by an access unit. A terminal is connected to an access unit via a pilot channel in order to set up a traffic channel to support a call. Each time the radio channel is lost or its quality is no longer able to meet its basic technical specifications, the terminal renegotiates the parameters of the traffic channel with the access unit via the pilot channel.

There are currently two approaches to defining a pilot channel in an opportunistic radio communications system.

With the first approach, the pilot channel is a dedicated physical channel. One or more bands of frequencies are reserved for supporting the pilot channel. It is not necessary for those frequency bands to belong to the set of frequency bands used for calls.

One drawback of that approach is that it requires static determination of frequency bands.

If the frequency bands dedicated to the pilot channel belong to the set of frequency bands used for calls, then that set must be sufficiently large for these frequency bands to meet traffic channel requirements as well as pilot channel requirements. Sizing is then based on the maximum number of traffic channels required, with the risk of those frequency bands being under used most of the time, leading to excessive consumption of frequency bands.

If the frequency bands dedicated to a pilot channel do not belong to the set of frequency bands used for calls, it is necessary to provide devices such as transmit/receive devices to enable these frequency bands to support a call.

Another drawback is that that approach implies a priori planning of the frequencies and identification of the frequency bands dedicated to supporting the pilot channel.

With the second approach, the pilot channel corresponds to an ultra wide band (UWB) physical channel. A UWB channel is then superposed on the spectrum of frequencies used for calls.

That approach has the drawback that for those frequency bands to be able to support a call it is necessary to provide procedures and devices such as transmit/receive devices.

There therefore exists a need for a technique for determining a pilot channel in an opportunistic radio communications system that does not require the use or provision of dedicated resources.

SUMMARY

To this end, an exemplary embodiment of the invention provides a method of creating a pilot channel in an opportunistic radio communications system of frequency spectrum that includes a set of frequency bands and in which successive frames of a radio communications channel are divided into timeslots, the method including steps of:
  opportunistically selecting a free frequency band in the frequency spectrum to support the pilot channel; and
  transmitting a beacon signal in at least one timeslot of successive frames of the pilot channel and probing the free frequency band in at least one timeslot different from the previous timeslot.

According to a preferred feature, a free frequency band in the frequency spectrum is opportunistically selected on the basis of a state table of the frequency spectrum.

According to a preferred feature, the state table of the frequency spectrum is obtained by probing all the frequency bands of the frequency spectrum and includes, for each frequency band, information on the busy state of the frequency band.

A pilot channel is opportunistically created by the method of an embodiment of the invention in a free frequency band of the spectrum based entirely on the knowledge of the state of the spectrum.

It is therefore not necessary to dedicate spectrum resources, here a frequency band, to support the pilot channel. Use of the resources of the frequency spectrum is therefore optimized.

Similarly, it is not necessary to create new resources to support the pilot channel.

The continuous transmission of a beacon signal facilitates detection of the pilot channel by a terminal of the opportunistic radio communications system.

Probing the frequency band supporting the pilot channel makes it possible to ensure continuous availability of that frequency band.

According to a preferred feature, the step of opportunistically selecting a free frequency band also includes selecting at least one back-up free frequency band.

Selecting at least one other frequency band as a back-up frequency band makes it possible to re-establish the pilot channel quickly, if necessary, in particular if the frequency band initially selected to support the pilot channel is no longer available.

According to a preferred feature, the method of an embodiment of the invention further includes steps of:
- synchronizing an access unit and a terminal of the opportunistic radio communications system to the pilot channel; and
- setting up a call between the access unit and the terminal on the pilot channel.

According to a preferred feature, the method of an embodiment of the invention further includes, before the synchronization and call set-up steps, a step of the terminal detecting the pilot channel.

According to a preferred feature, a call between the terminal and the access unit is effected in a plurality of successive frames of the pilot channel in at least one timeslot of the same rank in each of the successive frames, which timeslot is selected beforehand by the terminal.

Use of the pilot channel is therefore optimized.

According to a preferred feature, the method of an embodiment of the invention further includes a step of the access unit detecting conflict between a plurality of terminals when selecting at least one timeslot for a call.

According to a preferred feature, the method of an embodiment of the invention further includes a step of the terminals themselves resolving conflict between a plurality of terminals when selecting at least one timeslot for a call.

Detecting conflicts when selecting at least one timeslot for a call via the pilot channel by the access unit and resolution of such conflicts by the terminal has the advantage of making communication via the pilot channel more reliable without employing centralized access management mechanisms.

According to a preferred feature, the method of an embodiment of the invention further includes a step of the access unit re-establishing the pilot channel in the selected free frequency band after interruption of the pilot channel by the access unit.

According to a preferred feature, the method of an embodiment of the invention further includes a step of the access unit re-establishing the pilot channel in at least one back-up free frequency band after interruption of the pilot channel by the access unit.

Opportunistic management of the pilot channel makes it possible to re-create the pilot channel automatically if it is interrupted. The existence of at least one free back-up frequency band and the possibility of re-creating the pilot channel in one of those frequency bands makes it possible to reduce the time for which the pilot channel is interrupted.

An embodiment of the invention also provides an access unit adapted to function in an opportunistic radio communications system of frequency spectrum that includes a set of frequency bands and in which successive frames of a radio communications channel are divided into timeslots, this unit including:
- means for opportunistically selecting a free frequency band in the frequency spectrum to support the pilot channel; and
- means for transmitting a beacon signal in at least one timeslot of successive frames of the pilot channel and probing the free frequency band in at least one timeslot different from the previous timeslot.

An embodiment of the invention further provides a terminal adapted to function in an opportunistic radio communications system of frequency spectrum that includes a set of frequency bands and in which successive frames of a radio communications channel are divided into timeslots, this terminal including:
- means for detecting a pilot channel by detecting a beacon signal transmitted by an access unit of the opportunistic radio communications system;
- means for synchronization with the access unit on the pilot channel; and
- means for setting up a call with the access unit on the pilot channel in a plurality of successive frames of the pilot channel in at least one timeslot of the same rank in each of the successive frames, which at least one timeslot is selected beforehand by the terminal.

An embodiment of the invention further provides a computer program product used in an access unit adapted to function in an opportunistic radio communications system of frequency spectrum that includes a set of frequency bands and in which successive frames of a radio communications channel are divided into timeslots, the program product being characterized in that it includes instructions for executing the steps of the method described above that are executed by the access unit.

An embodiment of the invention further provides a computer program product used in a terminal adapted to function in an opportunistic radio communications system of frequency spectrum that includes a set of frequency bands and in which successive frames of a radio communications channel are divided into timeslots, the program product being characterized in that it includes instructions for executing the steps of the method described above that are executed by the terminal.

BRIEF DESCRIPTION OF THE DRAWINGS

An embodiment of the invention can be better understood in the light of the following description of a particular implementation of a method for creating a pilot channel in an opportunistic radio communications system, which description is given with reference to the appended drawings, in which.

DETAILED DESCRIPTION OF ILLUSTRATIVE EMBODIMENTS

An embodiment of the invention is described below in an opportunistic radio communications system in which a call is to be set up between an access unit and a terminal on the basis of opportunistic access to resources of the frequency spectrum.

Setting up a call between an access unit and a terminal is preceded by creating a pilot channel.

In this implementation of the invention, the pilot channel is created opportunistically.

Figure 1:
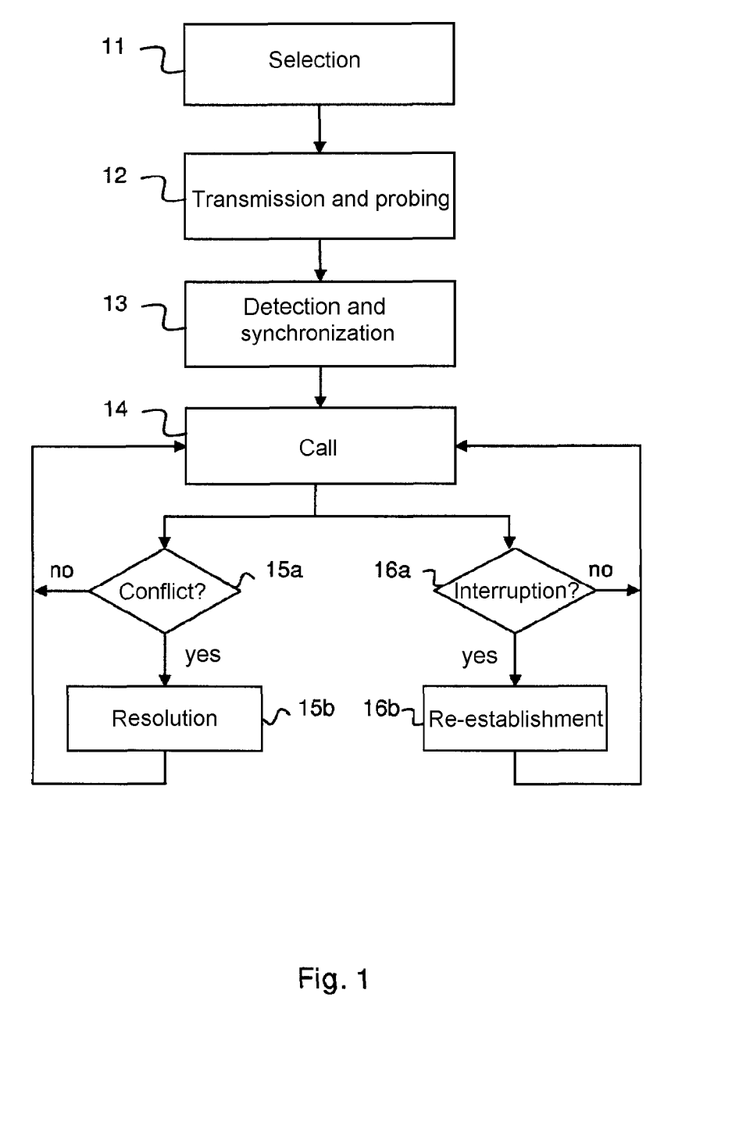
FIG. 1 is a flowchart of the method of the invention for creating a pilot channel in an opportunistic radio communications system.

FIG. 1 is a flowchart of the method of an embodiment of the invention of creating a pilot channel in an opportunistic radio communications system.

Referring to FIG. 1, the method includes a step 11 of selecting opportunistically in the frequency spectrum of the opportunistic radio communications system concerned at least one free frequency band that is to support a pilot channel.

In an opportunistic radio communications system the frequency spectrum W is divided into frequency sub-bands. For simplicity, in the remainder of the description, the expression frequency band is used to designate a frequency sub-band of the spectrum W.

Figure 2A:
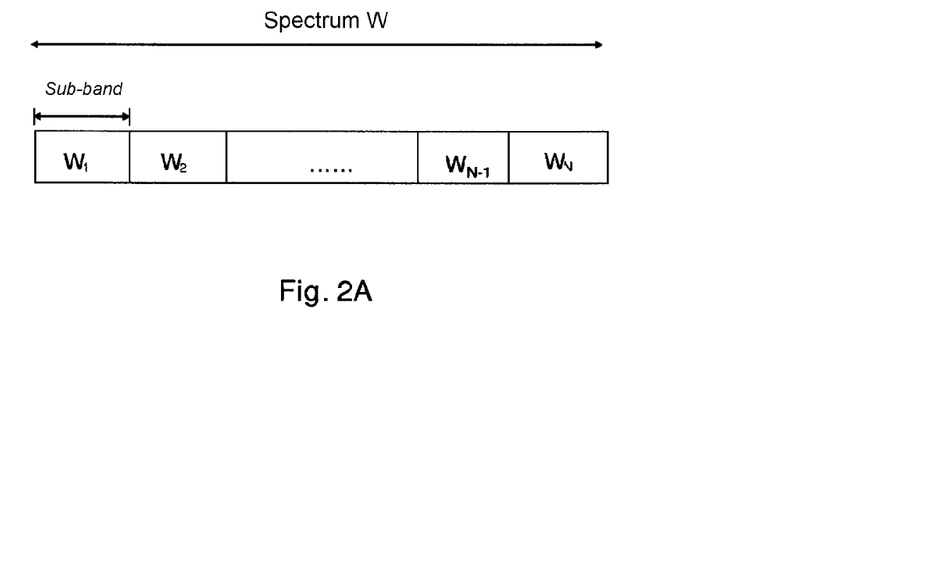
FIG. 2A shows a frequency spectrum of an opportunistic radio communications system.

FIG. 2A shows a frequency spectrum of an opportunistic radio communications system.

The frequency spectrum W is divided into N bands $W_i$ with i varying from 1 to N, such that:

$$|W| = \sum_{i=1}^{N} |W_i|$$

where || symbolizes the width in hertz (Hz) of the frequency spectrum W and the width of a frequency band $W_i$.

An opportunistic radio communication unit, such as an access unit or a terminal, has a state table for the frequency spectrum W.

That table includes data characteristic of a frequency band $W_i$ such as: band_id; state; c_coeff.

"band_id" is the identifier of the frequency band $W_i$ with i varying from 1 to N.

"state" is the state of the frequency band $W_i$ and has a value that differs according to whether the band is unknown, free, or busy. If the frequency band $W_i$ is busy, this may be because of a "primary" service (to which the frequency band is dedicated by laws or regulations) or by an opportunistic radio communications service. It takes a different value according to the nature of the service with which the frequency band $W_i$ is busy.

The state of the frequency spectrum W is detected and determined by probing the spectrum.

"c_coeff" is a confidence coefficient relating to the state of the frequency band $W_i$. Its initial value is obtained by probing and takes account of possible uncertainties linked thereto. If a frequency band is not probed for a long time, the value of the confidence coefficient decreases. If the same frequency band is probed again and its state has not changed since the previous probing, then the value of the confidence coefficient increases. Each time that the state of a frequency band changes, the confidence coefficient assigned to that frequency band is initialized with the value obtained by probing.

Each time that an opportunistic radio communication unit (access unit or terminal) probes a frequency band $W_i$ of the spectrum W it updates its state table for the spectrum relating to that band.

A plurality of opportunistic radio communication units can exchange their respective spectrum state tables to pool their view of the spectrum. If the "state" value relating to the same frequency band is identical in the spectrum state tables exchanged by the various units then the corresponding confidence coefficient increases.

During the step 11, the access unit selects a first free frequency band, i.e. a first frequency band in which there is no traffic.

The access unit bases this selection on information available in its state table for the frequency spectrum W, notably the "state" value.

In the same way, another free frequency band is selected to provide a back-up solution, if necessary, in the event of unavailability of the band initially selected.

Alternatively, a plurality of free frequency bands can be selected as back-up frequency bands.

During a step 12, the access unit performs two operations on the free frequency band selected in the preceding step 11:
  transmitting a beacon signal B; and
  probing S the frequency band concerned.

In an opportunistic radio communications system signals are transmitted in a frequency band using a transmission mode such as the time-division multiple access (TDMA) mode, for example.

In the TDMA mode, the frame of an opportunistic radio communications channel is divided into M timeslots ($Int_0, \ldots, Int_{M-1}$) where M is a parameter of the opportunistic radio communications system concerned.

Figure 2B:
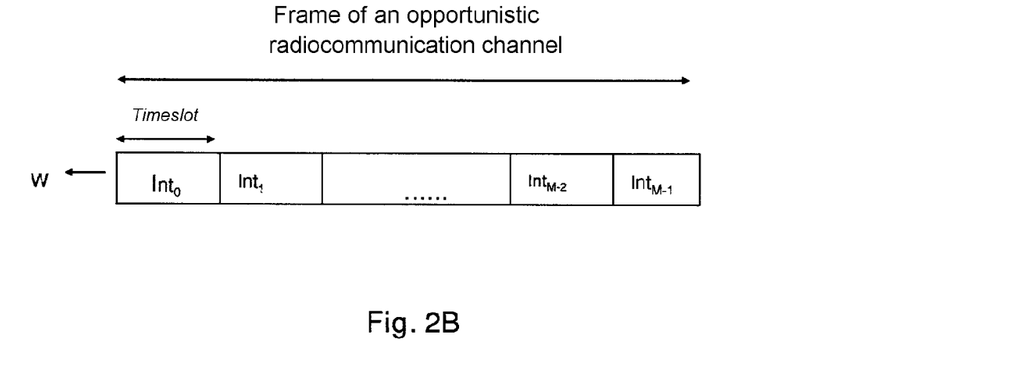
FIG. 2B shows a frame of an opportunistic radio communications system.

FIG. 2B shows a frame of an opportunistic radio communications channel.

Referring to FIG. 2B, the frame of the pilot channel is divided into M timeslots ($Int_0, \ldots, Int_{M-1}$).

Figure 3A:
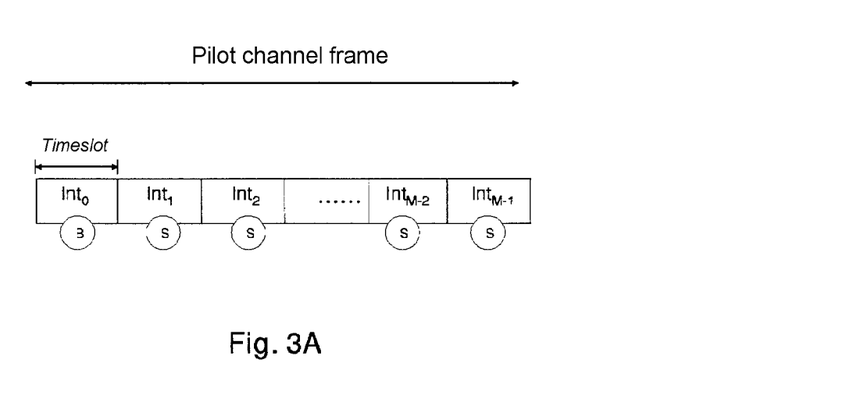
FIG. 3A shows one particular way of transmitting a beacon and frequency band probing signal in a frame of an opportunistic radio communication pilot channel such as that shown in FIG. 2B.

FIG. 3A shows one particular way of transmitting a beacon and frequency band probing signal in a frame of an opportunistic radio communication pilot channel such as that shown in FIG. 2B.

The access unit transmits a beacon signal B during a timeslot of the pilot channel frame.

By way of a non-limiting example of the invention, the access unit transmits a beacon signal B during the first timeslot $Int_0$ (see FIG. 3A).

Figure 3B:
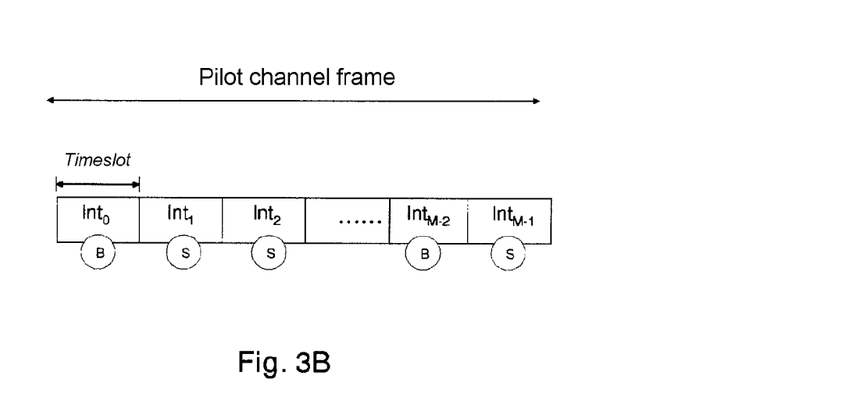
FIG. 3B shows a variant of that one particular way of transmitting a beacon and frequency band probing signal in a frame of an opportunistic radio communication pilot channel such as that shown in FIG. 3A.

FIG. 3B shows a variant of that one particular way of transmitting a beacon and frequency band probing signal in a frame of an opportunistic radio communication pilot channel such as that shown in FIG. 3A.

In this variant, the beacon signal B is transmitted during a plurality of timeslots of the same frame of the pilot channel.

By way of example (see FIG. 3A), the access unit transmits a beacon signal B during the timeslots $Int_0$ and $Int_{M-2}$.

The beacon signal B is transmitted in all the successive frames of the pilot channel and throughout the duration of a timeslot.

Generally speaking, a beacon signal carries the following information:
  an identifier of an opportunistic radio communications service;
  a list of free timeslots in the frame of the opportunistic radio communications channel; and
  if the beacon signal is transmitted more than once in the same frame, the numbers of the timeslots during which the beacon signal is transmitted.

The access unit also probes S the frequency band selected to support the pilot channel.

Probing makes it possible to fill in the state table of the frequency spectrum as described above.

As shown by way of non-limiting example in FIGS. 3A and 3B, this probing S is carried out during a plurality of timeslots of a frame of the pilot channel.

In the example shown in FIG. 3A, this probing is carried out in timeslots $Int_1$, $Int_2$, $Int_{M-2}$ and $Int_{M-1}$ of the pilot channel frame.

In the example shown in FIG. 3B, this probing is carried out in timeslots $Int_1$, $Int_2$, and $Int_{M-1}$ of the pilot channel frame.

Probing can be carried out in a timeslot in different ways:
to probe a single frequency band, that of the pilot channel; and
to probe two or more than two frequency bands, including that of the pilot channel; the timeslot is then divided into time portions corresponding to each of the probed frequency bands.

The timeslots in which probing is carried out are separate from the timeslots during which the beacon signal is transmitted.

In the remainder of the description, and by way of non-limiting illustration, a beacon signal is considered to be transmitted at least once in timeslot $Int_0$ and probing of the frequency band is considered to be effected at least in timeslot $Int_{M-1}$ of the pilot channel frame. Thus for two successive frames probing is effected in the last timeslot of the first frame and the beacon signal is transmitted in the first timeslot of the next frame.

Following steps 11 and 12, the access unit has created a pilot channel opportunistically.

For it to be possible for a call between an access unit and a terminal to be set up afterwards, the following conditions must be met by both of the two units concerned:
they must select the same frequency band for calls; and
they must be synchronized to the same timeslot.

These conditions are met during a step 13 shown in FIG. 1 of the terminal detecting a pilot channel and the terminal and the access unit being synchronized to that pilot channel.

In order to select the same frequency band for calls as an access unit, a terminal begins by detecting a pilot channel created by an access unit serving the geographical area in which it is located.

For this purpose, the terminal probes the frequency spectrum W looking for a beacon signal B including an identifier of an opportunistic radio communications service.

When the terminal detects a beacon signal B, it extracts the information contained in that signal.

The terminal is then synchronized with the access unit. The terminal and the access unit are synchronized to the timeslot in which the beacon signal B is transmitted (for example, the first timeslot $Int_0$ of the frame or another timeslot if the beacon signal is transmitted more than once in the same frame).

Referring to FIG. 1, during a step 14, the terminal and the access unit set up a call on the pilot channel, in particular, in the implementation of the invention described here, in order to negotiate the parameters of the call to be set up.

The terminal and the access unit communicate in successive frames of the pilot channel in a selected timeslot that is of the same rank for all the successive frames. During the selected timeslot in a given frame, the terminal sends and the access unit receives and then, in the next frame, during the selected timeslot of the same rank, the access unit sends and the terminal receives, and so on in successive frames.

The timeslot for calls between the terminal and the access unit is selected at random by the terminal. To this end, the terminal selects a free timeslot in the frame of the pilot channel from the list of free timeslots contained in the beacon signal.

If the selected timeslot is after the timeslot for transmitting the beacon signal to which the terminal and the access unit are synchronized, the call begins in the current frame. This situation arises if the terminal and the access unit are synchronized to timeslot $Int_0$ for transmitting the beacon signal, for example.

Otherwise, i.e. if the selected free timeslot is before the timeslot for transmitting the beacon signal for the purposes of synchronization, the call begins in the next frame.

After selecting a free timeslot for calls, the terminal transmits a signal including signaling information during that timeslot in the frame defined above.

The access unit, which is in receive mode at this time, detects the signal transmitted by the terminal and deduces from it the free timeslot selected by the terminal for calls. From these elements, the access unit updates the information contained in the beacon signal, including the list of free timeslots.

After step 14, a call has therefore been set up between the access unit and the terminal. This call is effected in successive frames of the pilot channel, based on transmission during the timeslot selected by the terminal and of the same rank in each of the successive frames.

Alternatively, to set up a call with the access unit, the terminal can select a plurality of timeslots in the pilot channel frame.

Figure 4A:
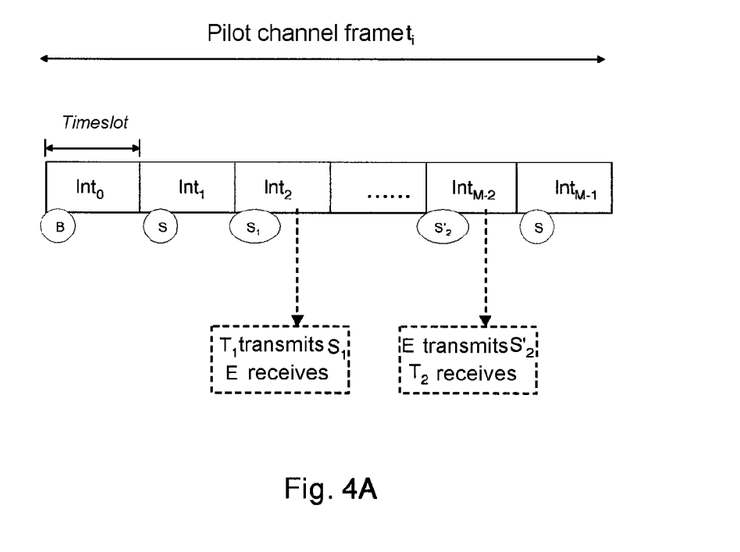
FIGS. 4A and 4B show the progress of a call over two successive frames of an opportunistic radio communication pilot channel such as that shown in FIG. 2B.
Figure 4B:
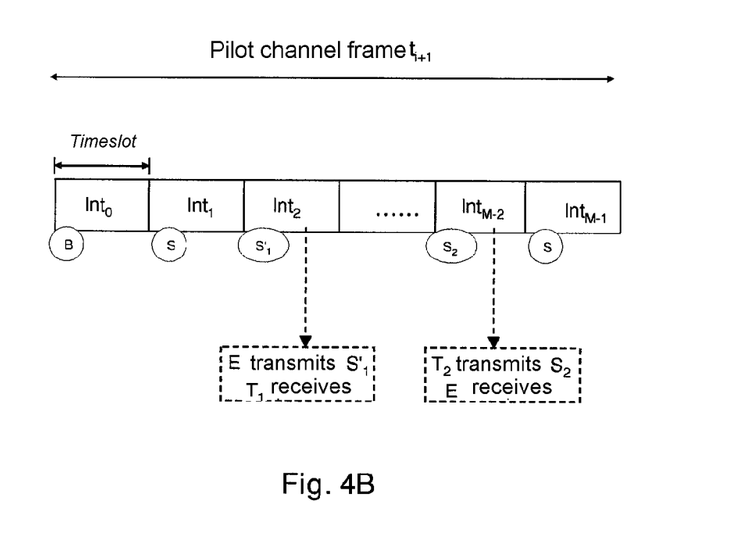

FIGS. 4A and 4B show the progress of a call over two successive frames of an opportunistic radio communication pilot channel such as that shown in FIG. 2B.

FIG. 4A represents a pilot channel frame $t_i$ in which:
the access unit E transmits a beacon signal B during timeslot $Int_0$;
the access unit E probes the frequency band during timeslot $Int_1$ and during the last timeslot $Int_{M-1}$;
a terminal $T_1$ transmits a signal $S_1$ during the selected timeslot $Int_2$, during which the access unit E receives; and
the access unit E transmits a signal $S'_2$ during the selected timeslot $Int_{M-2}$, during which a terminal $T_2$ receives.

FIG. 4B represents the pilot channel frame $t_{i+1}$ following the pilot channel frame $t_i$, in which:
the access unit E transmits the beacon signal B during timeslot $Int_0$;
the access unit E probes the frequency band during timeslot $Int_1$ and during the last timeslot $Int_{M-1}$;
the access unit E transmits a signal $S'_1$ during the selected timeslot $Int_2$, during which the terminal $T_1$ receives; and
the terminal $T_2$ transmits a signal $S_2$ during the selected timeslot $Int_{M-2}$, during which the access unit E receives.

The steps 15a and 15b shown in FIG. 1 are respectively conflict detection and conflict resolution steps.

If during a frame $t_c$ a plurality of terminals detect the same beacon signal transmitted by an access unit and then select at random at least one free timeslot for communicating with that access unit, they may happen to select the same at least one timeslot.

When during the next frame $t_{c+1}$ the terminals transmit during the timeslot that they have previously selected, the access unit detects the conflict. Because there is conflict, the access unit does not modify the list of free timeslots in the list of free timeslots of the beacon signal transmitted during timeslot $Int_0$, for example.

Because of the conflict, the access unit does not transmit during the next frame $t_{c+2}$. The access unit remains in receive mode. The terminals that are then in receive mode receive no signal from the access unit and deduce from this that a conflict has occurred.

The terminals in conflict then renew the random selection of at least one free timeslot from the list of free timeslots in the beacon signal transmitted during the timeslot $Int_0$, for example.

During the frame $t_{c+2}$ in which the access unit remains in receive mode (because of a conflict between terminals), other terminals that select at least one free timeslot on the basis of the information in the beacon signal of the first timeslot $Int_0$ that has not been updated may happen to select a timeslot for which conflict already exists.

This can be avoided in the following manner: when at least one timeslot is selected by a first terminal, and before any information is transmitted, the terminal checks the list of free timeslots in the beacon signal of the first timeslot $Int_0$. If the state of the selected timeslot has changed, this indicates that another terminal has selected that timeslot in the meantime. The first terminal therefore does not transmit information but instead resumes the process of selecting at least one free timeslot.

Referring to FIG. 1, steps 16a and 16b are respectively interruption detection and pilot channel re-establishment steps.

The access unit may be called upon to interrupt the pilot channel. This situation arises, for example, when in timeslots in which the access unit probes the frequency band used to support the pilot channel it detects that the pilot channel is busy with a "primary" service (a service to which the frequency band is dedicated by laws or rules).

For example, in each successive frame the terminal detects and analyzes the content of the beacon signal of the first timeslot $Int_0$ of the frame concerned.

If the terminal does not detect a beacon signal during the first timeslot $Int_0$ of a frame, it deduces from this that the access unit has changed the frequency band for supporting the pilot channel.

The terminal has the following solutions available to resolve this situation:
the terminal switches to at least one of the back-up frequency bands selected during step 11 and attempts to detect a beacon signal in that frequency band; if it succeeds in doing so, this indicates that the pilot channel has been re-established in that back-up frequency band; if not, it returns to the frequency band initially selected for supporting the pilot channel and attempts again to detect a beacon signal in that frequency band; if it does not succeed after a limited number of attempts, it resumes the complete process of seeking a pilot channel; and
if a traffic channel is active between the access unit and the terminal, it is possible to use some of the capacity of that traffic channel temporarily to negotiate the re-establishment of the pilot channel.

Figure 5:
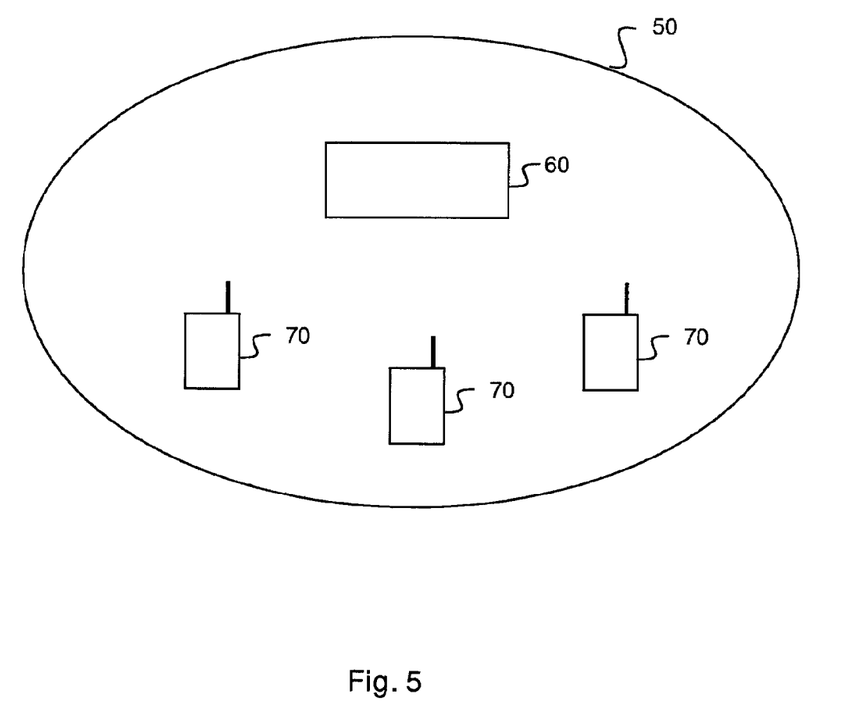
FIG. 5 shows an opportunistic radio communications system.

FIG. 5 shows an opportunistic radio communications system.

In the opportunistic radio communications system 50 of one implementation of the invention described here and shown in FIG. 5 a pilot channel is created between an access unit 60 and a terminal 70.

The access unit may be a base station or any other access unit of a radio communications network. The terminal may be a user terminal.

Figure 6:
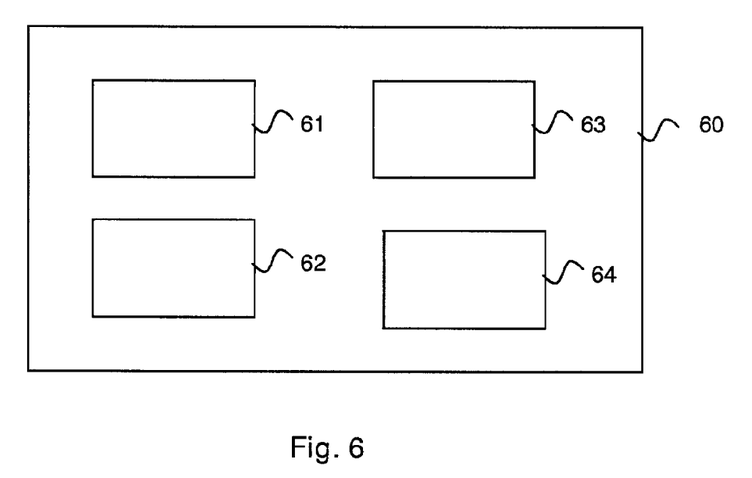
FIG. 6 shows an access unit of an opportunistic radio communications system such as that shown in FIG. 5.

FIG. 6 shows an access unit in an opportunistic radio communications system such as that shown in FIG. 5.

The access unit 60 shown in FIG. 6 is able to function in an opportunistic radio communications system in which the successive frames of a radio communications channel are divided into timeslots and the frequency spectrum W of which includes a set of N frequency bands.

The access unit 60 includes means 61 for opportunistically selecting a free frequency band in the frequency spectrum W to support a pilot channel.

The access unit 60 has access to a state table of the frequency spectrum W including data characteristic of each of the N frequency bands $W_i$ (with i varying from 1 to N). The state table of the spectrum includes a "state" entry that corresponds to the state of the band $W_i$ and has a different value according to whether the band is unknown, free or busy.

The means 61 select a free frequency band on the basis of the "state" value contained in the state table of the frequency spectrum W, as described above with reference to step 11.

The means 61 also select at least one additional free frequency band to provide a back-up solution, if required, in the event of unavailability of the band initially selected.

The access unit 60 also includes means 62 for transmitting a beacon and frequency band probing signal.

The frame of an opportunistic radio communications channel supported by a frequency band is divided into M timeslots $(Int_0, \ldots, Int_{M-1})$ where M is a parameter of the opportunistic radio communications system concerned. Similarly, the frame of the pilot channel is divided into M timeslots $(Int_0, \ldots, Int_{M-1})$.

In the step 12 the means 62 transmit a beacon signal B during a timeslot of the pilot channel frame or during a plurality of timeslots of the same pilot channel frame.

The means 62 also probe S the frequency band supporting the pilot channel during a plurality of timeslots of the pilot channel frame.

The access unit 60 also includes means 63 for synchronization with a terminal 70 of the opportunistic radio communications system on the pilot channel.

Referring to step 13, the access unit 60 is synchronized with a terminal 70 in a timeslot during which the beacon signal is transmitted.

The access unit 60 also includes means 64 for setting up a call between the access unit 60 and a terminal 70 on the pilot channel.

In step 14, a call is set up between the access unit 60 and a terminal 70 and proceeds over a plurality of successive frames of the pilot channel, based on transmission during at least one timeslot of the same rank for each of the successive frames. The timeslot for the call is selected by the terminal 70.

The access unit 60 further includes a central control unit, not shown, connected to each of the means 61 to 64 and adapted to control their operation.

The means 61 to 64 can be software modules forming a computer program. An embodiment of the invention therefore further provides a computer program for an access unit 60 including software instructions for executing the steps that are executed by the access unit 60.

A software module can be stored in or transmitted by a data medium. This can be a hardware storage medium, for example a CD-ROM, a magnetic diskette or a hard disk, or a transmissible medium such as an electrical, optical or radio signal.

Figure 7:
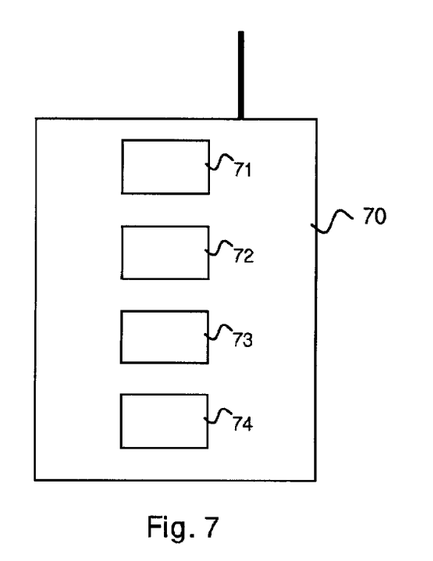
FIG. 7 shows a terminal of an opportunistic radio communications system such as that shown in FIG. 5.

FIG. 7 shows a terminal in an opportunistic radio communications system such as that shown in FIG. 5.

The terminal 70 shown in FIG. 7 is able to function in an opportunistic radio communications system in which the successive frames of a radio communications channel are divided into timeslots and the frequency spectrum W of which includes a set of N frequency bands.

The terminal 70 includes means 71 for detecting a pilot channel. The means 71 probe the frequency spectrum W seeking a beacon signal B including an identifier of an opportunistic radio communications service as described above for step 13.

The terminal 70 also includes means 72 for synchronization with an access unit of the opportunistic radio communications system on the pilot channel detected by the means 71 for detecting a pilot channel.

In step 13 the terminal 70 is synchronized with an access unit 60 in a timeslot during which the beacon signal B is transmitted.

The terminal 70 also includes means 73 for selecting at least one timeslot in the pilot channel frame for setting up a call with an access unit 60 on that pilot channel.

To set up a call, the terminal 70 selects randomly at least one free timeslot in the pilot channel frame based on a list of free timeslots in the beacon signal, as described above for step 14.

The terminal 70 also includes means 74 for setting up a call with an access unit 60 on the pilot channel.

In step 14, a call is set up between the terminal and an access unit 60 and proceeds over a plurality of successive frames of the pilot channel, based on transmission during at least one timeslot selected by the terminal and of the same rank for each of the successive frames.

The terminal 70 further includes a central control unit, not shown, connected to each of the means 71 to 74 and adapted to control their operation.

The means 71 to 74 can be software modules forming a computer program. An embodiment of the invention therefore further provides a computer program for a terminal 70 including software instructions for executing the steps that are executed by the terminal 70.

A software module can be stored in or transmitted by a data medium. Said medium can be a hardware storage medium, for example a CD-ROM, a magnetic diskette or a hard disk, or a transmissible medium such as an electrical, optical or radio signal.

Example embodiments of the invention as described above can be applied in wireless connection protocols for home networks and networks of sensors. Such systems can be deployed in frequency bands that do not require a licence.

Moreover, an embodiment of the invention can be applied to "opportunistic" extensions of current systems such as Wi-Fi (WIreless FIdelity) and GSM (Global System for Mobile communication) systems by specifying a pilot channel and enabling renegotiation of physical channels "on the fly".

Although the present disclosure has been described with reference to one or more examples, workers skilled in the art will recognize that changes may be made in form and detail without departing from the scope of the disclosure and/or the appended claims.

The invention claimed is:

1. A method of creating a pilot channel in an opportunistic radio communications system having a frequency spectrum that includes a set of frequency bands and in which successive frames of a radio communications channel are divided into timeslots, the method being executed by an access unit and comprising:
   opportunistically selecting a free frequency band in the frequency spectrum to support the pilot channel on the basis of a state table of the frequency spectrum, wherein the state table is obtained by probing all the frequency bands of the frequency spectrum and includes for each frequency band information on a busy state of the frequency band; and
   transmitting on the selected free frequency band a beacon signal in at least one timeslot of successive frames of the pilot channel and probing the free frequency band in at least one timeslot different from the timeslot in which the beacon signal is transmitted.

2. The method according to claim 1, wherein the step of opportunistically selecting a free frequency band also includes selecting at least one back-up free frequency band.

3. The method according to claim 1, further comprising:
   synchronizing an access unit and a terminal of the opportunistic radio communications system to the pilot channel; and
   setting up a call between the access unit and the terminal on the pilot channel.

4. The method according to claim 3, further comprising before the synchronization and call set-up steps, a step of the terminal detecting the pilot channel.

5. The method according to claim 3, wherein a call between the terminal and the access unit is effected in a plurality of successive frames of the pilot channel in at least one timeslot of a same rank in each of the successive frames, which is selected beforehand by the terminal.

6. The method according to claim 5, further comprising a step of the access unit detecting conflict between a plurality of terminals when selecting at least one timeslot for a call.

7. The method according to claim 5, further comprising a step of the terminals themselves resolving conflict between a plurality of terminals when selecting at least one timeslot for a call.

8. The method according to claim 3, further comprising a step of the access unit re-establishing the pilot channel in the selected free frequency band after interruption of the pilot channel by the access unit.

9. The method according to claim 5, further comprising a step of the access unit re-establishing the pilot channel in at least one back-up free frequency band after interruption of the pilot channel by the access unit.

10. An access unit adapted to function in an opportunistic radio communications system having a frequency spectrum that includes a set of frequency bands and in which successive frames of a radio communications channel are divided into timeslots, the access unit comprising:
    means for opportunistically selecting a free frequency band in the frequency spectrum to support a pilot channel on the basis of a state table of the frequency spectrum, wherein the state table is obtained by probing all the frequency bands of the frequency spectrum and includes for each frequency band information on a busy state of the frequency band; and
    means for transmitting on the selected free frequency band a beacon signal in at least one timeslot of successive frames of the pilot channel and probing the free frequency band in at least one timeslot different from the timeslot in which the beacon signal is transmitted.

11. A terminal adapted to function in an opportunistic radio communications system having a frequency spectrum that includes a set of frequency bands and in which successive frames of a radio communications channel are divided into timeslots, the terminal comprising:
    means for detecting a pilot channel by detecting a beacon signal transmitted by an access unit of the opportunistic radio communications system;
    means for synchronization with the access unit on the pilot channel; and
    means for setting up a call with the access unit on the pilot channel in a plurality of successive frames of the pilot channel in at least one timeslot of a same rank in each of the successive frames, wherein the at least one timeslot is selected beforehand by the terminal.

12. A hardware storage medium storing a computer program product used in an access unit adapted to function in an opportunistic radio communications system having a frequency spectrum that includes a set of frequency bands and in which successive frames of a radio communications channel are divided into timeslots, the program product including instructions for executing a method of creating a pilot channel in the opportunistic radio communications system when executed by the access unit, the method comprising:

opportunistically selecting a free frequency band in the frequency spectrum to support the pilot channel on the basis of a state table of the frequency spectrum, wherein the state table is obtained by probing all the frequency bands of the frequency spectrum and includes for each frequency band information on a busy state of the frequency band; and transmitting on the selected free frequency band a beacon signal in at least one timeslot of successive frames of the pilot channel and probing the free frequency band in at least one timeslot different from the timeslot in which the beacon signal is transmitted.

13. A hardware storage medium storing a computer program product used in a terminal adapted to function in an opportunistic radio communications system having a frequency spectrum that includes a set of frequency bands and in which successive frames of a radio communications channel are divided into timeslots, the program product including instructions, which when executed by the terminal, perform a method comprising:

detecting a pilot channel by detecting a beacon signal transmitted by an access unit of the opportunistic radio communications system;

synchronizing with the access unit on the pilot channel; and setting up a call with the access unit on the pilot channel in a plurality of successive frames of the pilot channel in at least one timeslot of a same rank in each of the successive frames, which at least one timeslot is selected beforehand by the terminal.

* * * * *